United States Patent [19]
Wiley, III et al.

[11] Patent Number: 4,952,076
[45] Date of Patent: Aug. 28, 1990

[54] FLUID DAMPER FOR THRUST BEARING

[75] Inventors: Walter H. Wiley, III; Charles D. Aaron, Jr., both of Palm Beach Gardens; Russell L. Carlson, North Palm Beach; Charles L. Davis, III; Ronald A. Marmol, both of Palm Beach Gardens, all of Fla.

[73] Assignee: United Technologies Corporation, Hartford, Conn.

[21] Appl. No.: 383,389

[22] Filed: Jul. 21, 1989

[51] Int. Cl.$^5$ .............................................. F16C 27/00
[52] U.S. Cl. ...................................... 384/99; 384/535
[58] Field of Search ................ 384/99, 610, 611, 609, 384/615, 535, 581

[56] References Cited

U.S. PATENT DOCUMENTS

| 4,046,430 | 9/1977 | Buono et al. | 384/99 |
| 4,084,861 | 4/1978 | Greenberg et al. | 384/99 |
| 4,213,661 | 7/1980 | Marmol | 384/99 |
| 4,337,983 | 7/1982 | Hibner | 384/99 |
| 4,496,252 | 1/1985 | Hörler et al. | 384/535 X |
| 4,509,804 | 4/1985 | Klusman | 384/535 X |
| 4,657,410 | 4/1987 | Hibner | 384/99 |
| 4,668,105 | 5/1987 | Furukawa et al. | 384/99 |
| 4,669,893 | 6/1987 | Chalaire et al. | 384/99 |

Primary Examiner—Thomas R. Hannon
Attorney, Agent, or Firm—Norman Friedland

[57] ABSTRACT

A film squeeze damper for a thrust bearing includes a plurality of curved beam segments each having a fluid chamber adjacent the support housing and mounted end to end to surround the thrust bearing. Side mounted nibs transmit the thrust load from a radial dependent member of the outer race to the support housing through each segment. This permits unrestrained radial damping of vibratory energy occasioned by the unbalance in the supported shaft. A mechanical stop is provided by the design to limit radial deflection of the segment during a high rotor unbalance.

13 Claims, 4 Drawing Sheets

FLUID DAMPER FOR THRUST BEARING

TECHNICAL FIELD

This invention relates to gas turbine engines and particularly to the damper utilized for the thrust bearing supporting the engine's shaft.

BACKGROUND ART

As is well known, it is conventional to utilize a fluid or oil squeeze film damper to dampen the radial loads transmitted from the working parts of the engine through the radial bearings. Such dampers for example are disclosed in U.S. Pat. Nos. 4,213,661 granted to R. P. Marmol on July 22, 1980, 4,046,430 granted to D. F. Buono et al on Sept. 6, 1977, and 4,669,893 granted to D. Chalaire et al on June 2, 1987, all of which are assigned to UTC the assignee of this patent application.

The U.S. Pat. No. 4,669,893 exemplifies a fluid damper that includes an annular fluid chamber that surrounds the bearing and is disposed between the bearing outer race and a stationary support and is associated with the radial bearing supporting the compressor/turbine shaft of a gas turbine engine. The fluid damper serves to control the transversal orbital movement of a nonrotating cylinder induced by the vibratory energy created by unbalance in the rotating shaft. Obviously, the energy level or the amplitudes of the vibration is particularly high during a surge or loss of blade on the rotor.

Other damper designs include a segmented ring supported to a stationary support that includes a plurality of fluid filled chambers. These chambers are formed on the convex surface of each segment of the segmented ring and are bounded by an elongated circular seal sometimes referred to as in a race track which is continuously supplied with oil. The oil filled chambers are sandwiched between the convex surface and the outer race of the bearing and like the full annular fluid damper serve to dampen the vibratory motion of the shaft. In some instances a spring operatively connected to the stationary support serves to resiliently support and load the bearing. Rod springs, sometimes referred to as squirrel cages, are customarily used in these applications.

While it is conventional to dampen radial bearings with fluid dampers as described above, thrust bearings require different considerations over radial bearing inasmuch as the severe thrust loadings create significant friction to impede the operation of the fluid damper during normal rotor unbalance. An example of a fluid damper design is described in U.S. Pat. No. 4,084,861 granted to P. B. Greenberg et al on Apr. 18, 1978 and assigned to U.T.C., the assignee common to this patent application. This damper design includes an annular fluid chamber and a squirrel cage spring arrangement.

We have found that we can obviate the problems associated with the squirrel cage and the damper with the annular fluid chamber for use with thrust bearings by employing a curved beam damper design. Contemplated within the scope of the invention is a segmented curve beam having oval or sometimes referred to as race track shaped chambers with nibs strategically located on each segment to transmit the thrust loads without incurring adverse frictional loads thus permitting damping during normal rotor unbalance or other reasonable unbalance excursions.

A nib at the forward side face of the segment centrally located transmits the thrust load from the outer race to the stationary housing where it is reacted by a pair of nibs located on the rear side face at each edge of the segments. Since the nibs, which do not deflect radially, contact the bearing support housing friction is further reduced.

A mechanical stop is provided to assure minimum radial travel of the segmented ring during an exceeding high unbalance occasioned from, say, a loss of a blade.

DISCLOSURE OF INVENTION

An object of this invention is to provide an improved fluid damper for thrust bearings of a gas turbine engine.

A feature of this invention is to provide a segmented curve beam damper with each segment having race track configured fluid filled chambers and nibs strategically located at the fore and rear side edges for transmitting the thrust loads.

A further feature is to provide for a segmented curved beam damper mechanical stop means for limiting the radial deflection of the segment during a high rotor unbalance.

The forgoing and other features and advantages of the present invention will become more apparent from the following description and accompanying drawings.

BEST MODE FOR CARRYING OUT THE INVENTION

Figure 1:
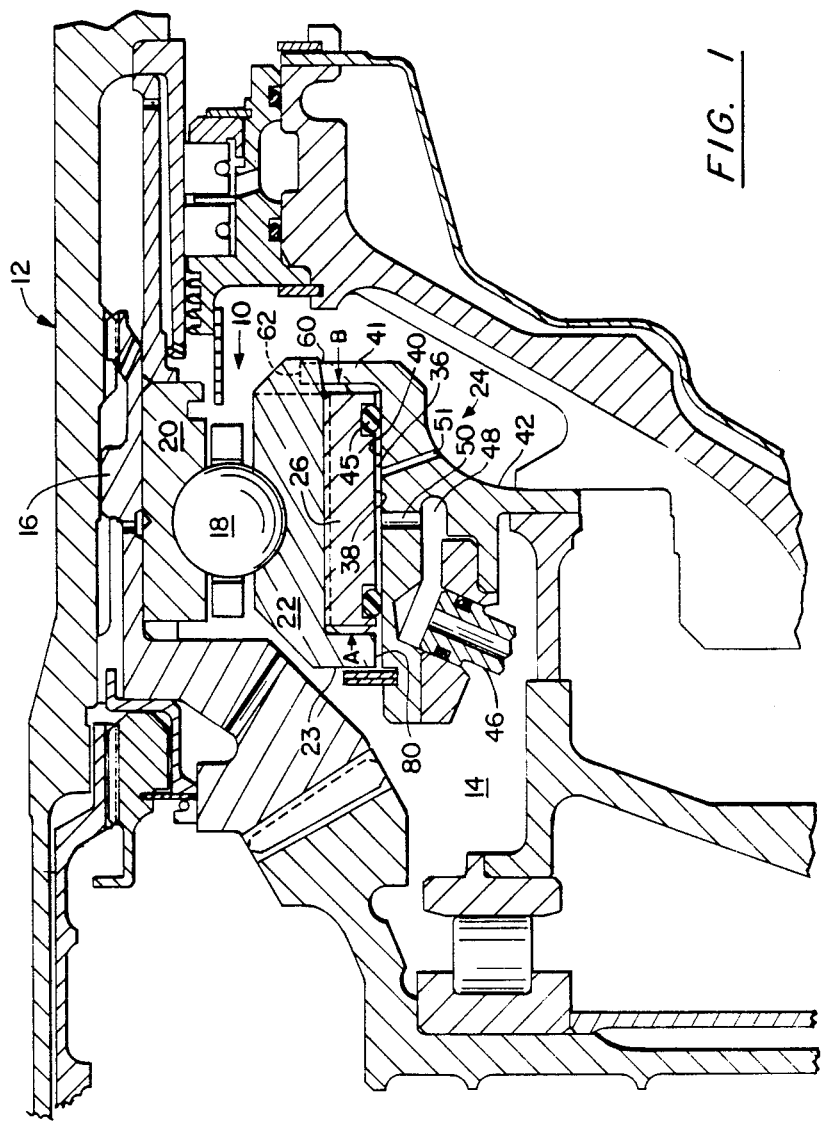
FIG. 1 is a partial view in section showing the invention located in the thrust bearing compartment of a gas turbine engine.

While the invention is its preferred embodiment is utilized in a gas turbine power plant for supporting the shaft interconnecting the turbine and compressor, it should be understood that the invention may have utility in other embodiments. For a better understanding of the invention, reference is made to FIGS. 1-7 (inclusive) showing the curved beam damper utilized with the thrust bearing generally illustrated by reference numeral 10 rotatably supporting shaft 12 and supported in bearing compartment 14.

While this configuration shows a stub shaft 16 splined to shaft 12 for extracting power from the engine, for convenience and simplicity, it is only necessary to recognize that bearing 10 is a conventional thrust bearing having a plurality of spherical balls 18 sandwiched between the inner race 20 and outer race 22. The invention relates to the damper mechanism generally illustrated by reference numeral 24 that serves to support and dampen the vibratory energy typically inherent in gas turbine engine, yet capable of preventing adverse condition in the event of exceedingly high dynamic unbalance occasioned by engine surge or blade loss.

Figure 2:
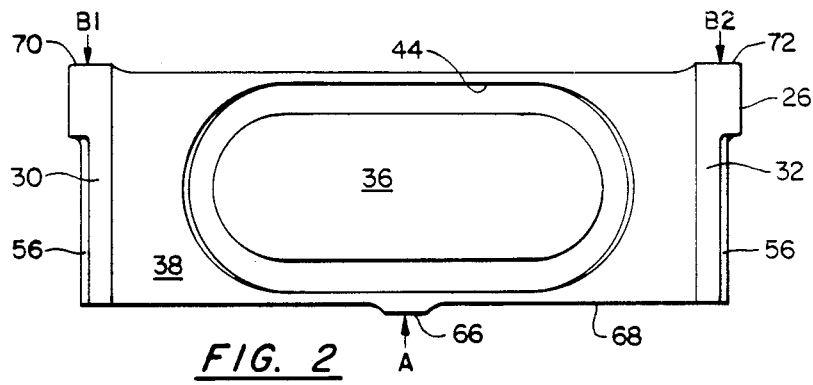
FIG. 2 is a top perspective view of a segment of the curved beam damper.
Figure 3:
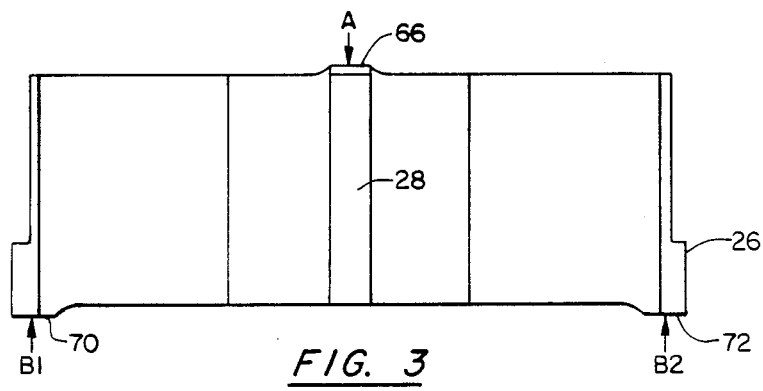
FIG. 3, is a bottom perspective view of the segment of FIG. 2.

The damper comprises a plurality of segments 26 mounted end to end to subscribe a 360° ring surrounding bearing 10. Each segment 26 is a curved beam having a standup 28 on the inside diameter surface at its center and standups 30 and 32 on the outside diameter surface at either end. Loads occasioned by shaft unbalance are transmitted through bearing 10 to the center standup 28 which contacts the outer diameter surface of the bearing outer race 22. Rotor unbalances cause the segment 26 to deflect and compress the oil film captured in the cavity 36 formed between the outer diameter surface 38 of segment 26 and the inner diameter surface 40 of the bearing support housing 42. Each segment is formed with an oil filled chamber or cavity 36 as best shown in FIG. 2. The cavity 36 is formed on the outer diameter surface 38 and is bounded by a groove 44 configured in a race track shape for supporting an "O" ring 45. Cavity 36 is continuously fed oil from the oil supply line 46 that feeds the manifold 48 that is in continuous communication with each of the oil filled cavities 36 of each of the segments 26 as will be described hereinbelow.

Each cavity 36 may have two inlet holes 50 (one being shown) and an outlet 51 (see FIG. 1). Upon deflection of the segment, the cavity 36 is compressed, the oil in the outlet becomes essentially blocked and the oil in the cavity flows back to the manifold 48 via the inlets 50. The reason this occurs is because the flow coefficient of the inlet holes 50 is significantly greater than the flow coefficient of the exit hole 51. Although some flow will be vented through the exit 51, the flow will be negligible relative to the flow through the inlet holes 50.

Each segment 26 is locked to housing 42 by keys 52 inserted in the recess 54 formed by slots 56 formed on the side edges 56 of segments 36 and the broach 58 formed in housing 42. The keys 52 prevent rotation of the segments 26 relative to housing 42. The outer race 22 is keyed to housing 42 by dogs 60 (3 equally spaced) fitting into complimentary broached slots 62 formed in the outer diameter of outer race 22 likewise preventing rotation.

As mentioned above, in heretofore known designs of fluid dampers, the thrust would typically be transmitted from the outer race to a stationary flange. The frictional force at this juncture was sufficiently high to adversely affect the normal functioning of the fluid damper.

According to this invention, the thrust loads are transmitted from the outer race 22 to housing 42 through three nibs. The first nib 66 is formed centrally of segment 26 at the forward side face 68 and the other two nibs 70 and 72 are formed at the ends of segment 26 on the rear side face 74. The load, hence, is from flange 23 of outer race 22 into contact point A at center nib 66 (FIG. 4), laterally through the segment 26 and then reacted by flange 41 of housing 42 at contact points B1 and B2 at end nibs 68 and 70 (FIG. 5). (The contact points B1 and B2 are shown in FIG. 1 as reference letter B).

Figure 4:
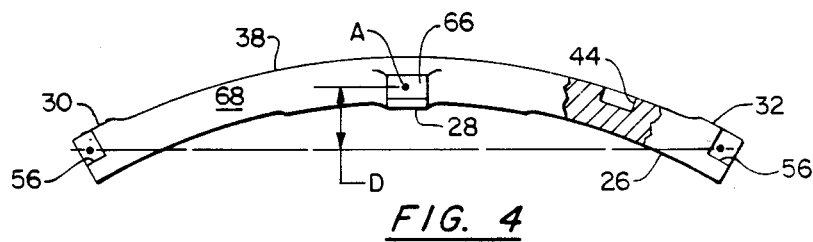
FIG. 4 is a front side plan view partly in section of the segment of FIG. 2.
Figure 5:
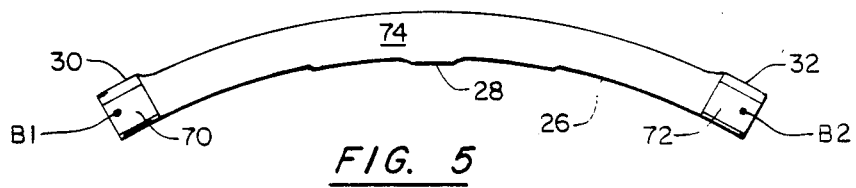
FIG. 5 is a rear side plan view of the segment of FIG. 2.

In accordance with this invention, the thrust load path is substantially in a straight line thus avoiding or minimizing the creation of a force couple depicted as arrow D in FIG. 4 which would otherwise adversely affect the damping function of the fluid damper as well as impacting its wear. Further, since the segments tends &:o pivot at the contact points rather than incurring a radial motion, wear of the segments at these contact points is minimized.

Figure 6:
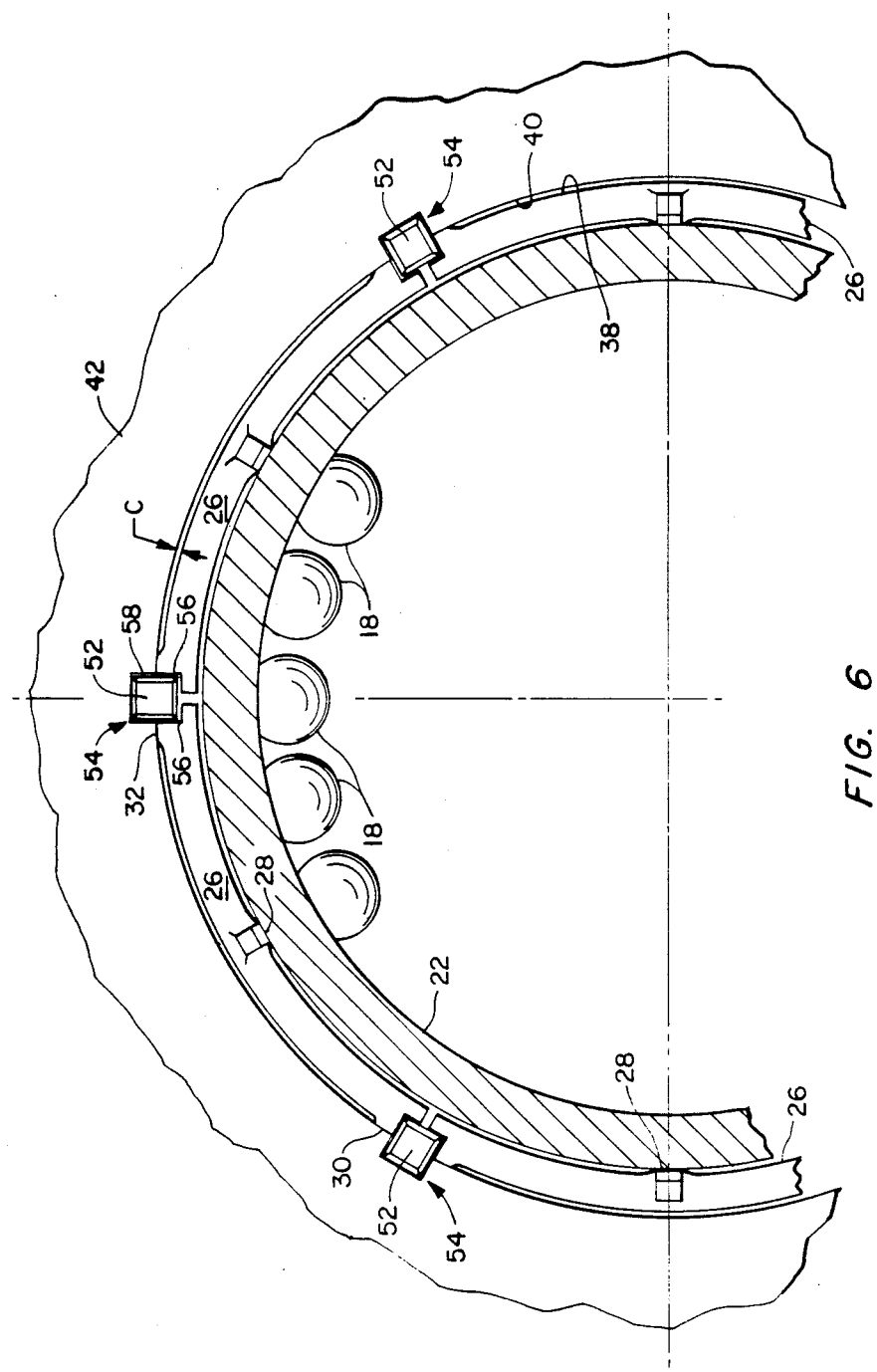
FIG. 6 is partial view in elevation of the thrust bearing and curved beam damper showing the anti-rotation mechanism.
Figure 7:
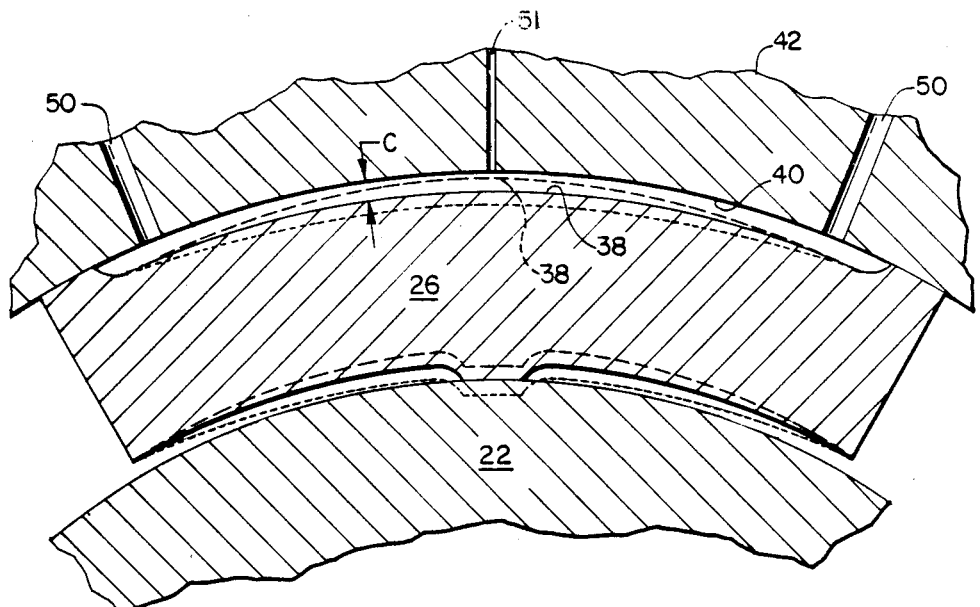
FIG. 7 is a schematic illustration showing an exaggeration of the deflection of the curved beam and the mechanical stop.

As noted in FIG. 6 and 7, the dimension C formed between the inner diameter wall surface 40 of housing 42 and the outer diameter wall surface 38 of segment 26 defines a mechanical stop which limits radial deflection of the segment. This is illustrated by the dash line in FIG. 7 where it will be appreciated that during a deflection, say occasioned by a blade loss, the maximum distortion of segment 26 is limited by abutting against wall surface 40.

Figure 8:
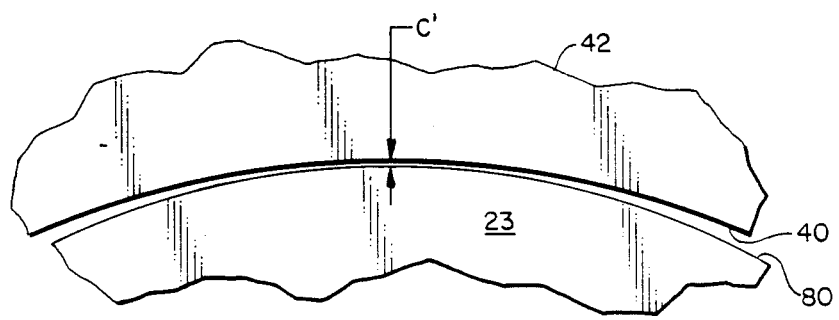
FIG. 8 is a partial view showing an alternative of the mechanical stop utilizing the outer diameter of the flange formed on the outer vane and the bearing.

Alternatively, it may be desirable to select the mechanical stop between the outer diameter surface 80 of flange 23 and wall surface 40. Hence, both surface 80 and surface 40 will come into contact preventing surface 38 from even contacting surface 40 as depicted in FIG. 8.

Although this invention has been shown and described with respect to detailed embodiments thereof, it will be understood by those skilled in the art that various changes in form and detail thereof may be made without departing from the spirit and scope of the claimed invention.

We claim:

1. For a thrust bearing rotatably supporting a shaft having a plurality of spherical balls sandwiched between an inner race and an outer race, a fluid damper comprising a plurality of curved beam segments mounted end to end encapsulating said thrust bearing and each segment having an outer diameter surface disposed adjacent a complementary surface formed on the housing supporting said thrust bearing and an inner diameter surface disposed adjacent said outer race and complementing the outer diameter surface of said outer race, the outer race having a radially outward depending member juxtaposed to the front side face of each of said segments, each segment having at least one nib extending axially from said front side face to bear against said radially outward depending member and another nib on the rear side face of each of said segments to bear against said housing, and a fluid filled chamber formed on said outer diameter surface of each of said segments for defining the fluid damper for absorbing the energy created by shaft unbalance whereby the thrust loads transmitted by said thrust bearing passes through said outer race to said housing through said nibs.

2. For a thrust bearing as claimed in claim 1 wherein said nib of said front side face is disposed centrally of each of said segments.

3. For a thrust bearing as claimed in claim 2 wherein said rear side face of each of said segments includes a nib disposed at the opposite edges of said rear side face.

4. For a thrust bearing as claimed in claim 3 wherein each of said segments include a first radially extending standup formed on said outer diameter surface of each of said segments and a second radially extending standup formed on said inner diameter surface of each of said segments and first radially extending standup bearing against said housing and said second radially extending standup bearing against said outer race whereby radial deflection of said thrust bearing compresses said fluid filled chamber through said first standup, said segment and said second standup.

5. For a thrust bearing as claimed in claim 4 wherein said first upstanding standup is disposed at one end of each of said segments, another radially extending standup is disposed on the opposite end of each of said segments, and said second standup is disposed centrally of each of said segments.

6. For a thrust bearing as claimed in claim 5 including mechanical stop means for limiting the radial displacement of each of said segments, said means including a predetermine gap between said outer diameter surface of each of said segments and said complementary surface of said housing.

7. For a thrust bearing as claimed in claim 5 including mechanical stop means for limiting the radial displacement of each of said segments, said means including the outer diameter surface of said radially outward depending member of said outer race and said complementary surface of said housing.

8. For a thrust bearing as claimed in claim 5 including key means for interlocking each of said segments and said housing including a key member cooperating with a slot formed in the edges of adjacent segments and said complementary surface of said housing.

9. For a thrust bearing as claimed in claim 8 including additional key means for preventing rotation of said outer race relative to said housing including a dog member dimensioned to fit into a slot formed in said outer race.

10. A thrust bearing as claimed in claim 1 wherein said fluid filled chamber is oval shaped in its planar direction and "O" ring seal means boundary said fluid filled chamber to prevent fluid from leaking through the side edges of said fluid filled chamber.

11. A thrust bearing as claimed in claim 1 including a plurality of inlet holes in said housing communicating with each of said fluid filled chambers and means for delivering fluid from a source of fluid to said fluid filled chambers through each of said inlet holes.

12. A thrust bearing as claimed in claim 11 including a manifold for distribution fluid interposed between said source and said first hole, said manifold formed in said housing and surrounding said plurality of segments.

13. A thrust bearing as claimed in claim 12 including at least one outlet hole communicating with each of said fluid filled chambers.

* * * * *

UNITED STATES PATENT AND TRADEMARK OFFICE
CERTIFICATE OF CORRECTION

PATENT NO. : 4,952,076

DATED : August 28, 1990

INVENTOR(S) : Walter H. Wiley, III, et al

It is certified that error appears in the above-identified patent and that said Letters Patent is hereby corrected as shown below:

Column 1, lines 5-8 , after the title, insert "This invention was made under a Government contract and the Government has rights herein."

Signed and Sealed this

Second Day of March, 1993

Attest:

STEPHEN G. KUNIN

Attesting Officer

Acting Commissioner of Patents and Trademarks